(12) United States Patent
Gysi

(10) Patent No.: US 6,750,420 B1
(45) Date of Patent: *Jun. 15, 2004

(54) METHOD FOR WELDING TUBES AND DEVICE FOR CARRYING OUT SAID METHOD

(75) Inventor: Peter Gysi, Bellikon (CH)

(73) Assignee: Elpatronic AG, Bergdietikon (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/831,801
(22) PCT Filed: Aug. 19, 1999
(86) PCT No.: PCT/CH99/00382
§ 371 (c)(1),
(2), (4) Date: May 14, 2001
(87) PCT Pub. No.: WO00/29163
PCT Pub. Date: May 25, 2000

(30) Foreign Application Priority Data

Nov. 13, 1998 (CH) .................................. 2280/98

(51) Int. Cl.⁷ .............................................. B23K 26/00
(52) U.S. Cl. ........................... 219/121.64; 219/121.82; 228/173.6; 228/17.5
(58) Field of Search ........................... 226/49.3, 173.1, 226/173.6, 17.5, 17; 219/121.63, 121.64, 121.82, 64; 72/176

(56) References Cited

U.S. PATENT DOCUMENTS

| 2,084,889 A | | 6/1937 | Blevins |
| 2,792,799 A | * | 5/1957 | Dahlstrom .................... 113/59 |
| 3,146,331 A | * | 8/1964 | Schubert ...................... 219/62 |
| 4,299,108 A | * | 11/1981 | Kato et al. .................... 72/178 |
| 4,614,293 A | * | 9/1986 | Pazzaglia ...................... 228/17 |
| 4,675,489 A | * | 6/1987 | Opprecht et al. ............. 219/64 |
| 4,774,391 A | | 9/1988 | Weil |
| 4,865,243 A | * | 9/1989 | Meier ......................... 228/15.1 |
| 4,905,885 A | | 3/1990 | Hellman, Sr. |
| 4,995,549 A | * | 2/1991 | Hellman, Sr. ................ 228/147 |
| 5,148,960 A | * | 9/1992 | Abbey et al. ............... 228/17.5 |
| 5,328,086 A | * | 7/1994 | Hall, Jr. ...................... 228/146 |
| 6,215,084 B1 | * | 4/2001 | Oberholzer et al. .......... 219/64 |
| 6,495,792 B1 | * | 12/2002 | Gysi ..................... 219/121.63 |

* cited by examiner

Primary Examiner—M. Alexandra Elve
Assistant Examiner—Len Tran
(74) Attorney, Agent, or Firm—McCormick, Paulding & Huber LLP (57) ABSTRACT

A tube welding machine (1) is of modular construction, the individual modules (2, 3, 4, 5) being arranged on a common support rail (6).

9 Claims, 9 Drawing Sheets

METHOD FOR WELDING TUBES AND DEVICE FOR CARRYING OUT SAID METHOD

BACKGROUND OF THE INVENTION

The invention relates to methods for welding tubes. The invention further relates to a modular machine for carrying out the invention.

Butt welding of tubes, e.g. by high-frequency welding, is known. DE-C-4432674 indicates a special holding device for the welding of thin-walled tubes that are welded e.g. by laser. There is an increasing demand, especially in the motor vehicle industry, for thin-walled tubes of extremely wide range of sizes which after welding can be shaped into body components by high pressure forming. "Thin-walled" is generally understood to mean tubes with a diameter to material thickness ratio of over 65. There is a demand for welding machines that are capable of economically welding such tubes in various shapes and sizes, and in quantities ranging from individual experimental models to series production runs.

Hence one fundamental problem of the invention is to provide a method whereby tubes in an extremely wide range of shapes and sizes can be presented for welding without costly retooling of the welding machine.

SUMMARY OF THE INVENTION

The present invention in one aspect, involves welding preformed tube-rounds into tubes by acting on the tube round at a plurality of points on its circumference simultaneously with pinching tools. The pinching tools are susceptible to individual power assisted adjustment toward and away from the longitudinal axis of the tube round.

By effecting the initial positioning of the tube-round by means of tools with power-driven adjustment, a multitude of tube shapes and sizes can be welded, with each new adaptation involving only a resetting, not a replacement, of the tools.

Another fundamental problem of the invention is, in respect of the welding tool itself, to achieve an optimal welding position for the welding edges of the tube-rounds positioned and/or centered in it, without lengthy setting operations.

To solve this problem, the preformed tube-rounds are welded in a method in which at least one driven adjustable element is used to modify the position of the edges of the tube round to be welded in advance of the welding tool and in response to an edge position detecting device.

The facility for affecting the positioning of the edges by means of elements with powerdriven adjustment allows welding, particularly laser welding, to be carried out is with the edges optimally located in relation to each other. It is also a fundamental problem of the invention to provide a welding facility that combines the greatest possible versatility in terms of tube shapes and sizes and quantities to be welded, with optimal welding results under these changing requirements.

This is accomplished with a machine with aninitial-centring module, and with acentring and welding module Making the machine of modular construction and arranging the individual modules on a carrier so that they are exchangeable and adjustable with respect to each other mean that optimal adaptation can be made to each to size and shape to be welded. Thus, several lead-in modules and initial-positioning modules can be provided according to the length of the tube and/or such modules can be quickly exchanged for modules adapted to the diameter-range of the tube. Also, by exchanging the centring and welding module, different welding means can easily be used. Preferably, modules are displaceable on the carrier unit so that they can be transferred into an inactive standby position, in which they do not interfere with the working of the active modules and from which they can easily be transferred back into the working position.

With an initial-centring module, it becomes possible to weld tubes of extremely diverse shapes on the same machine.

The centring and welding module provides for adjustment of the position of the edges of the tube-round in the welding zone and hence optimal welding of different tube shapes and sizes.

A further fundamental problem of the invention is to enable particularly thin-walled tubes to be welded. This is accomplished by a centring and welding module.

BRIEF DESCRIPTION OF THE DRAWINGS

Embodiments of the invention will now be described in detail by way of example and with reference to the figures, in which.

DESCRIPTION OF THE PREFERRED EMBODIMENTS

Figure 1:
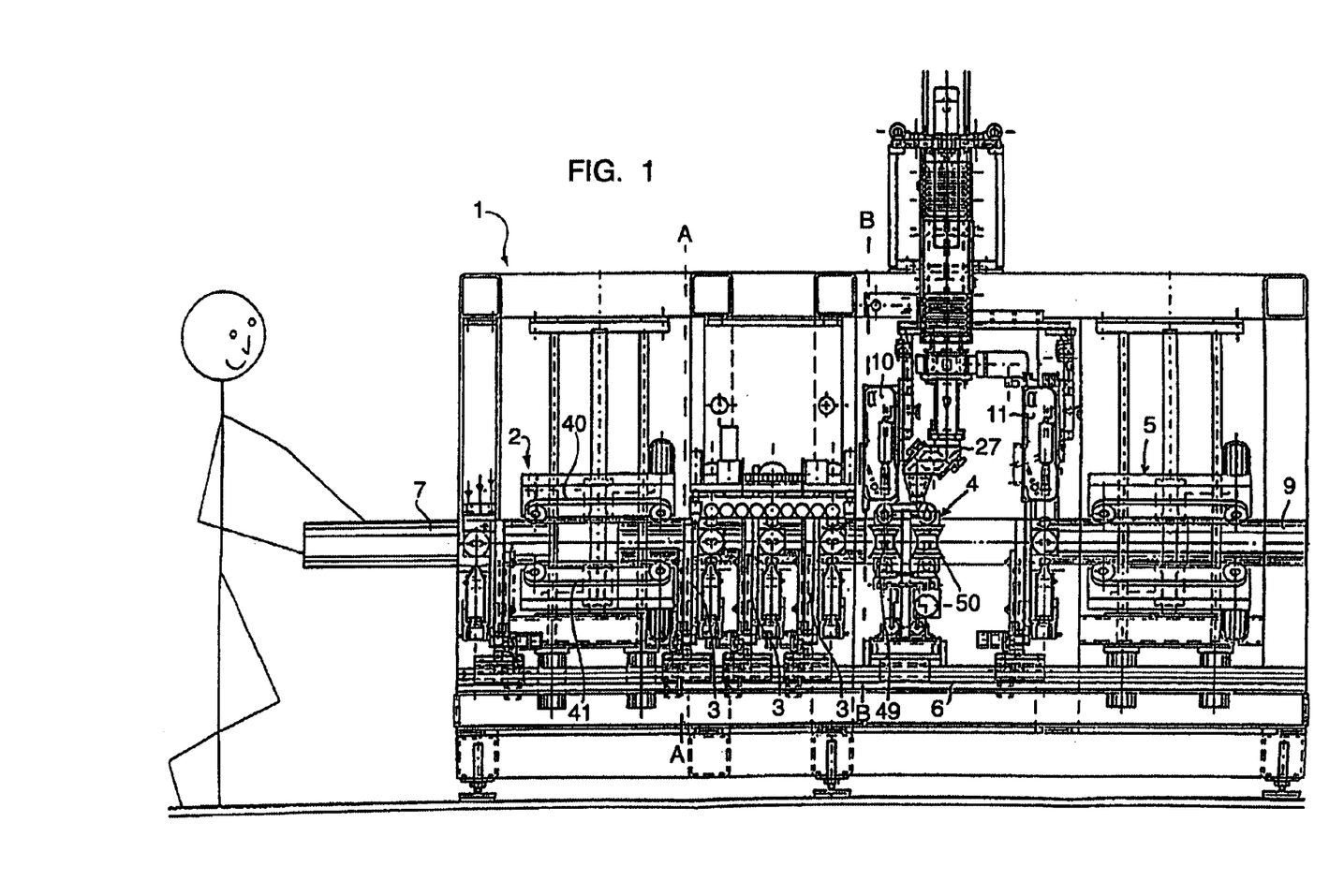
FIG. 1 is a side view of a modular tube welding machine.

FIG. 1 shows a schematic side view of a machine 1 for welding preformed tube-rounds 7 into tubes 9. This machine is of modular construction, and has a number of modules arranged on a common carrier device, which in the drawing comprises a rail 6. In the illustrated example, a lead-in module 2 can be seen, into which the preformed tube-round 7 can be inserted, and which conveys this tube-round to the initial-centring modules 3. The lead-in module may comprise e.g. live conveyor belts 40 and 41 which seize the tube-round and convey it towards the initial-centring modules 3. The lead-in module 2 is followed by at least one initial-centring module 3, and in the example shown, by three such modules, each of which has pinching tools for the tube-round which serve to centre and shape the tube-round ahead of the welding module 4. The modules 3 are followed by the welding module 4, which comprises a laser welding source 27 and centring sets 49 and 50 which bring the tube-round, which has been prepared in the initial-centring module, into the final position necessary for welding, and guide it through under the welding unit 27. Inspection devices 10 and 11 which e.g. check by optical means the position of the edges of the tube-round prior to welding and/or the weld seam after welding, and take corrective action through a control system, can be provided in the region of this module. Thus, inspection of the edges by means of the inspection device 10 can enable corrective action to in taken on the centring module in order to optimize the positioning of the edges for welding. The finished weld seam can be inspected by the device 11, and any tubes that have been badly welded can be eliminated on exit from the welding machine 1. After welding, the tubes 9 are transported out of the machine by an output module 5. The individual modules 2, 3, 4 and 5 are arranged on the common carrier device 6, and can be shifted thereon with respect to each other or removed therefrom. As will be described presently, one or more additional initial-centring module(s) 3 can be provided e.g. in lieu of the lead-in module 2. Also, a number of welding modules can be kept ready, and the module 4 appropriate for the present welding operation put in the machine. The modules may be exchangeable, and displaceable in the longitudinal direction on the carrier 6, and may be fixedly attachable, or movable on the carrier 6 in order to weld special tube shapes, as will be described later.

Figure 2:
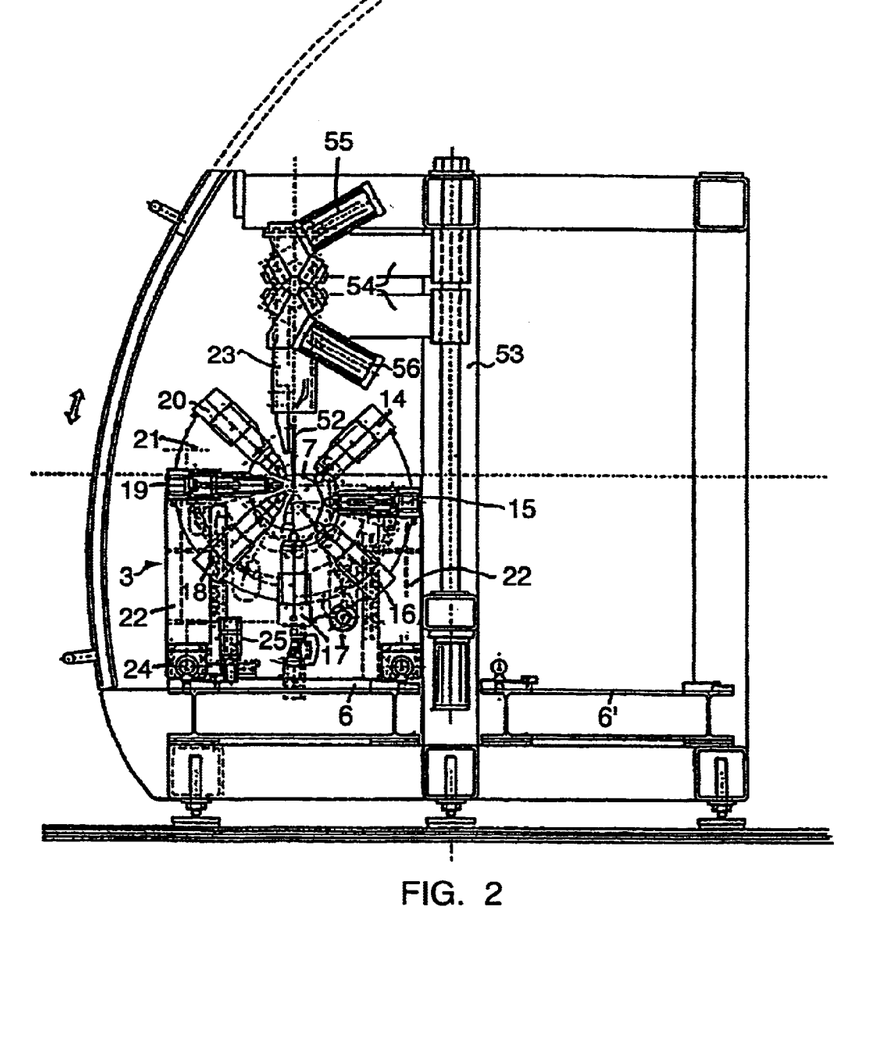
FIG. 2 is a vertical section view of the machine of FIG. 1.

FIG. 2 shows a vertical section through the machine 1 on the line A—A of FIG. 1. The carrier 6, and one initial-centring module 3, can be seen. In the example shown, this initial-centring module has 7 pinching tools 14–20 which are radially arranged and are able to act on the tube-round 7 in various ways depending on the extended position of the linearly extensible pinching tool. In FIG. 2, for reasons of drawing economy and to show different examples for the various tools 14–20, two different positions are illustrated, corresponding to two different sizes of tube-round. Depicted on the right-hand side is a setting for the tools 14, 15, 16 and 17 for a tube-round with a large diameter, and in the left half of the figure, a setting for the tools 20, 19 and 18—and also 17, though this is only hinted at—in which the tube-round has only a small diameter. Shown above the section of the module with the tools 14–20 is a dressing tool 23 which has a straightening element 52 dipping into the tube-round. This straightening element is sometimes referred to as the sword. Its function as it interacts with the tools 14–20 will be described in detail with reference to a later figure. The module 3 also has a mounting 22 and 21 for the tools 14–20. A mounting 53 and 54 is which extends over all three modules 3 is provided for the sword 52 and its drive 55 and 56. The module 3 rests via mountings 24 on the carrier 6. A further carrier 6' may be provided parallel with the carrier 6 for possible accommodation of spare or extra modules. In this case, the modules and the carriers 6 and 6' are designed so that modules can be moved back and forth between these carriers.

Figure 3:
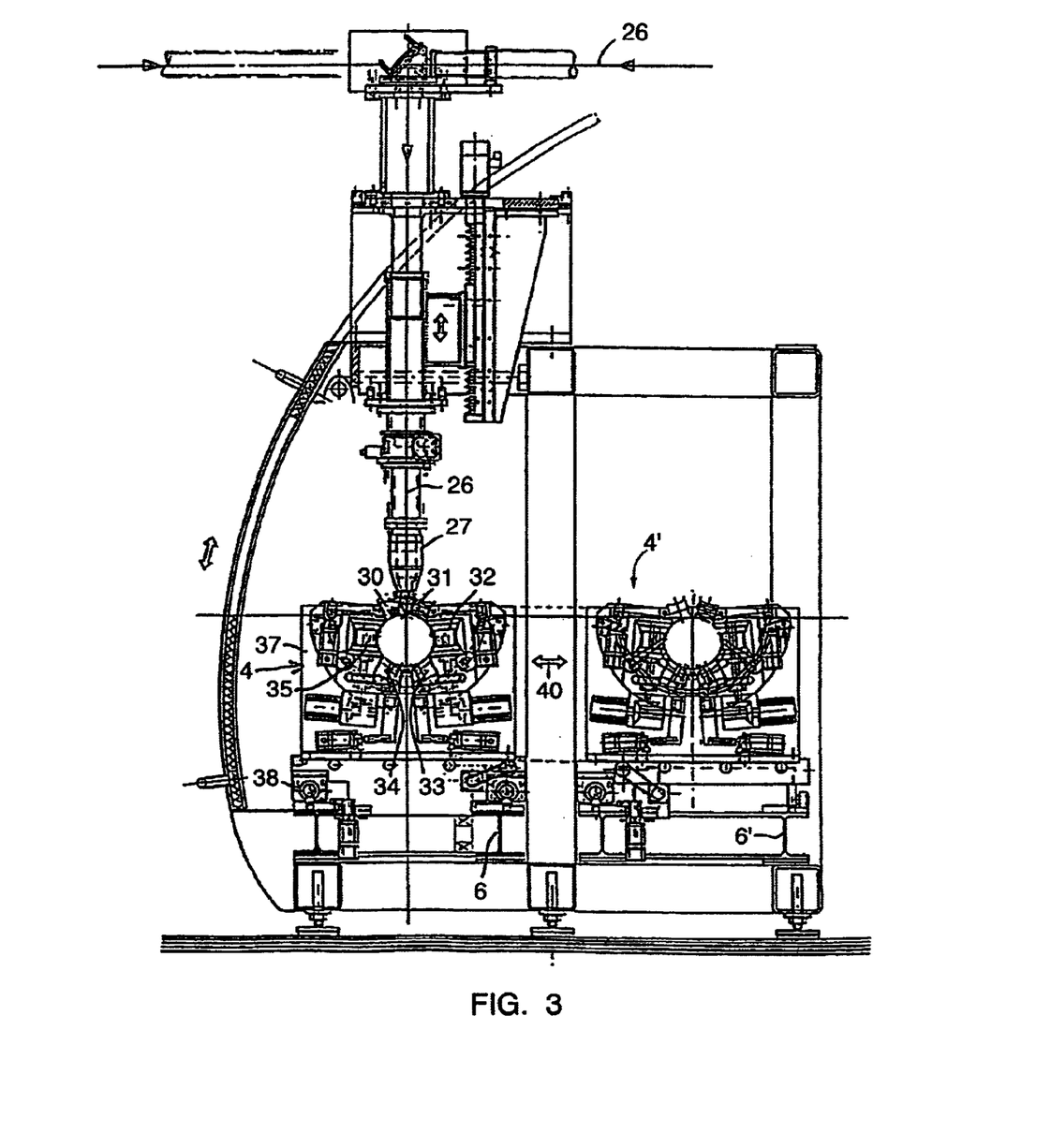
FIG. 3 is another vertical section view of the machine of FIG. 1.

FIG. 3 shows a section through the machine 1 of FIG. 1 on the line B—B, from which the edge monitoring device 10 has been omitted. It shows the centring and welding module 4, and another such module 4' has been placed on the carrier 6' so that it could easily be exchanged with the module 4 by shifting in the direction shown by the arrow 40. In the illustrated example, only the lower part of the module with the centring tools would be exchanged. But matters could be arranged so that the welding unit 27 (which in the present case contains a laser beam 26 from a laser source) would be exchanged as well. In the illustrated example, the centring module has two successive roller sets 49, 50 (FIG. 1), of which the set 49 with centring rollers 30–35 can be seen in FIG. 9. The rollers formed a roller-ring around the tube-round so that the tube-round is fed to the welding unit 27 and laser beam 26 with its edges correctly positioned for welding. Individual rollers or groups of rollers can be adjustable, as will be explained in more detail later. The rollers are carried on a mounting 37 and 38 which is supported on the carrier 6.

Figure 4:
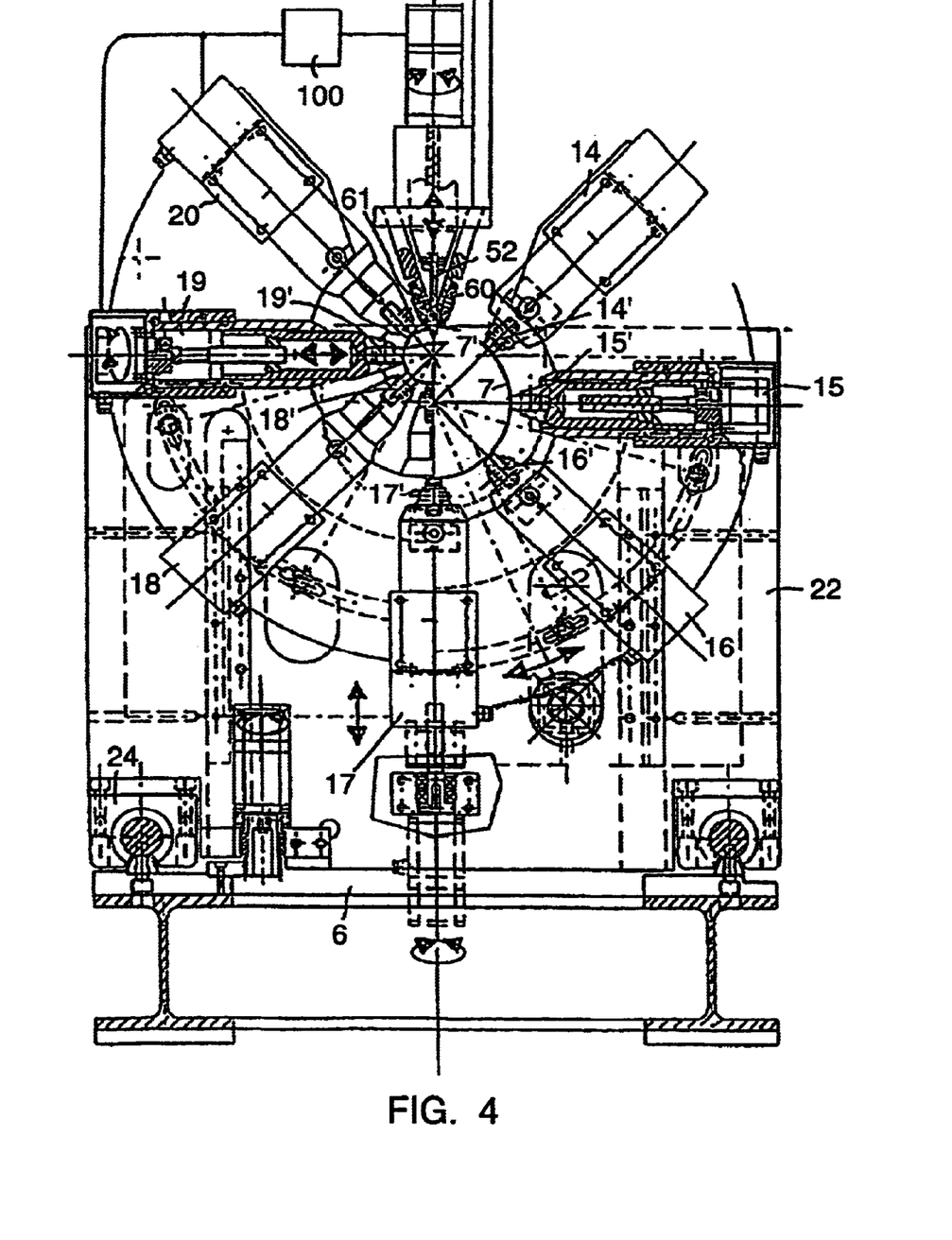
FIG. 4 is a view of an initial-centring module.
Figure 5:
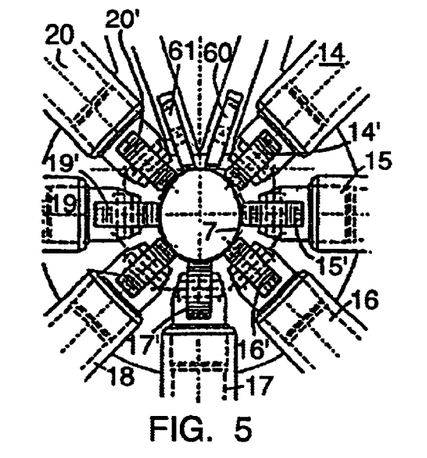
FIG. 5 is a view of the initial-centring module with a tube-round.
Figure 6:
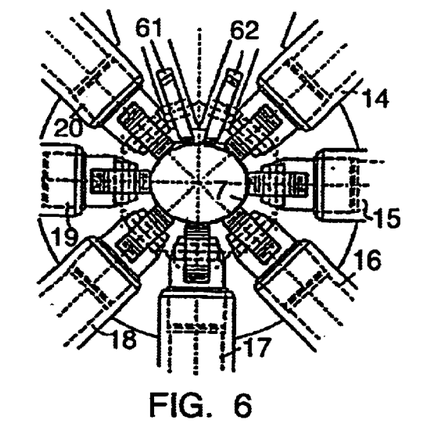
FIG. 6 is another view of the initial-centring module, with a tube-round of a different shape.
Figure 7:
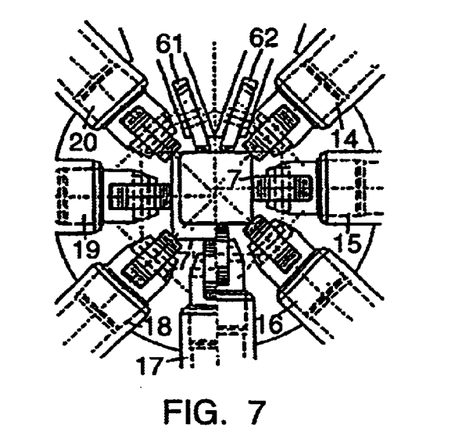
FIG. 7 is another view of the initial-centring module with a tube-round.
Figure 8:
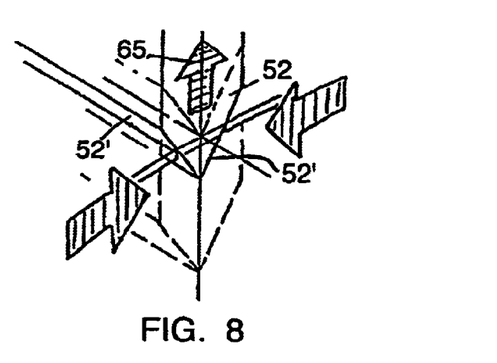
FIG. 8 is a schematic pictorial view of the "sword" of the initial-centring module.

FIG. 4 shows in greater detail one section of the initial-centring module 4, which is supported on the carrier 6 (where the same reference numbers occur they denote the same parts as before). Each pinching tool 14–20 has a contact head 14'–20' which is formed e.g. by a roller and which can be further extended or retracted in the longitudinal axis of the tool. Depending on the position of these rollers 14'–20', a lead-through opening for the tube-round of a different shape and size can be obtained. In FIG. 4 this is again indicated by showing a tuber-round 7 of large diameter in the right half of the drawing and a tube-round 7' of smaller diameter in the left half. The individual tools 1420 may have e.g. a rotary electrical drive which extends for retract the tool head by means of a spindle. A linear drive is also possible. The individual tools are controlled by a common control (indicated in the drawing by the block 100) to produce the lead-through opening desired. Thus the shape and size of the tube-round can in principle be set within wide limits by this initial-centring tool. FIG. 5 accordingly shows the lead-through opening set by the pinching tools 14–20 and their rollers 14'–20' for an oval welded tube. FIG. 6 shows the corresponding lead-through opening for an oval tube-round presented in the horizontal position, while FIG. 7 shows the setting for an essentially square tube-round 7 as well as for a larger square tube-round 7' which is again split into left and right drawing-halves to show the different tool positions. In FIG. 4 it can also be seen that a dressing tool 52 dips into the tube-round 7, which is not yet closed. FIG. 8 shows this in greater detail. The dressing tool or sword 52 has two converging faces 52'. The edges of the tube-round 7 bear on these faces. The dressing tool 52 thus forms a stop for the edges of the tube-round 7. This stop is withdrawn upwards in the direction of the arrow 65 when the edges of the tube-round 7 are drawn together by the pinching tools 14–20. Preferably, rollers 60 and 61, which may e.g. also be magnetic and magnetically attract the edges of the tube-round, are also provided near the sword 52 on either side of it, to establish, in conjunction with the sword 52, a defined position of the edges. The sword 52 is gradually drawn out of the tube-round so that a butting position of the edges of the tube-round 7 is made in the initial-centring tool. Thus the initial-centring module allows tube-rounds of the most diverse shapes and diameters to be centred easily without the tube welding machine's having to be converted upon each changeover. All that is necessary is to set the corresponding diameter and shape of tube-round by means of the control for the pinching tools 14–20. If it should be necessary to weld a tube-round which exceeds the setting range of the modules 3, the modules 3 can be exchanged for other modules which have a different setting range, and these other modules can be provided on the reserve carrier unit 6' so that the exchange can be made quickly.

Figure 9:
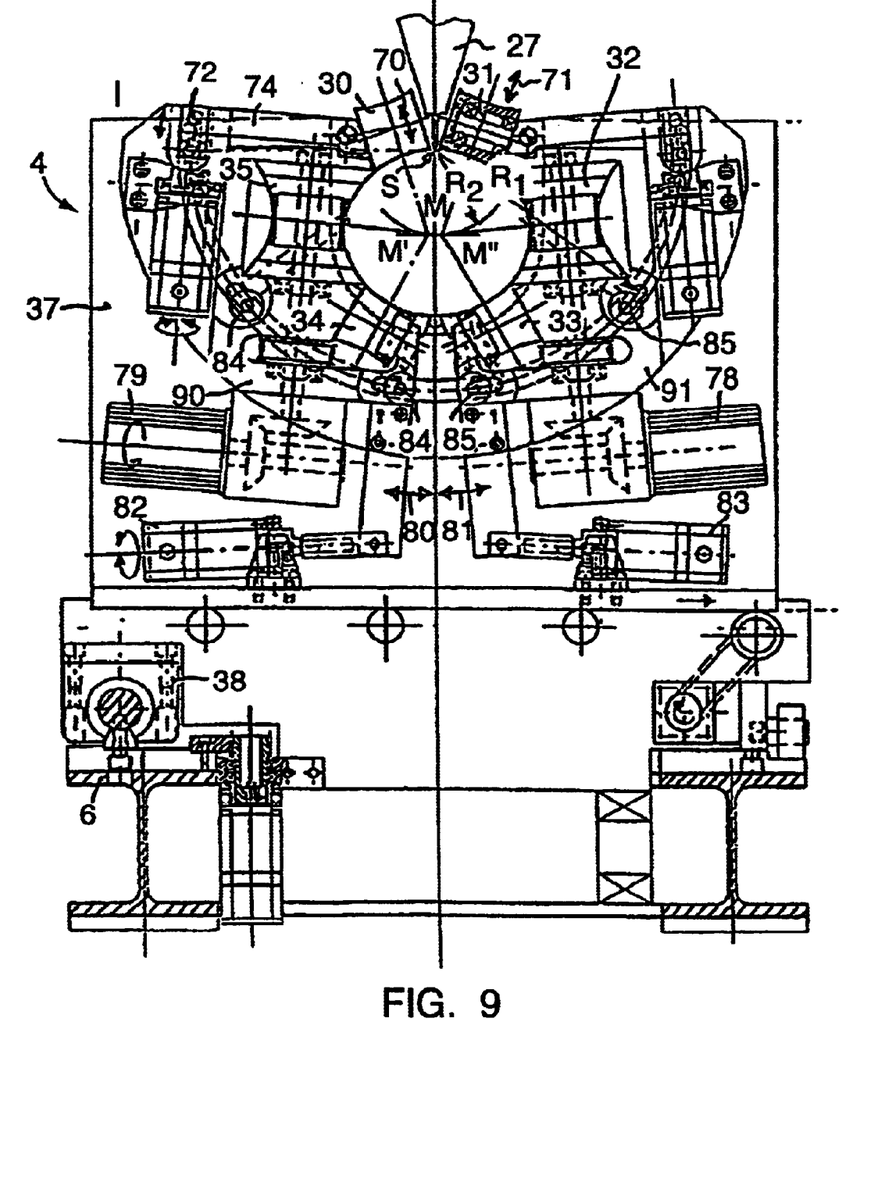
FIG. 9 is a view of the centring and welding module.

FIG. 9 is a view of the centring and welding module in which only a part of the welding unit 27 is shown. The module 4 has the above-mentioned rollers 30–35 arranged in a ring surrounding the tube-round 7 to be welded, and centring it for welding. Preferably, the rollers 30 and 31 are susceptible to slight power-assisted adjustment in the direction of the arrows 70 and 71 respectively, in order to influence directly the position of the opposed butted edges of the tube-round 7 in the welding zone. This may be performed e.g. on the basis of the output signal of the monitoring unit 10 (FIG. 1). The roller 30 may for example be adjusted by tilting the arm 74 about the pivot 72, and this may be performed by the drive motor 73. Adjustment of the roller 31 is by a similar drive. By 9 adjusting the rollers 30 and 31, it is possible to ensure that the edges of the tube-round do not gape so as to form a V that is open on the side towards the welding beam, which is detrimental to sound welding, but stand precisely parallel with each other, or at worst gape so as to form a V that opens downwards, which is also acceptable for laser welding.

But the ring-shaped centring tool with the rollers 30–35 can alternatively or additionally be used in another way to act on the tube-round. The tool can for example consist of two halves, one half carrying the rollers 31, 32 and 33, and the other half carrying the rollers 30, 34 and 35. The rollers 22 and 23 can in this this case be driven in rotation by drives 78 and 79 respectively to propel the tube-round through the centring module. The two halves of the centring tool can be tilted in relation to each other about a centre of rotation S, as indicated by the arrows 80 and 81. The tilting can be effected by the drives 82 and 83. This tilting of the centring tool to open and close it around the tube-round affords another possible way of acting on the latter in the centring and welding tool so as to affect the position of the edges and thus to obtain a weld of sound quality. The halfmounts 90 and 91 for the rollers can be guided in slot-guides 84 and 85 of the mounting 37 to permit the tilting action of the two halves as they move towards or away from each other.

Figure 10:
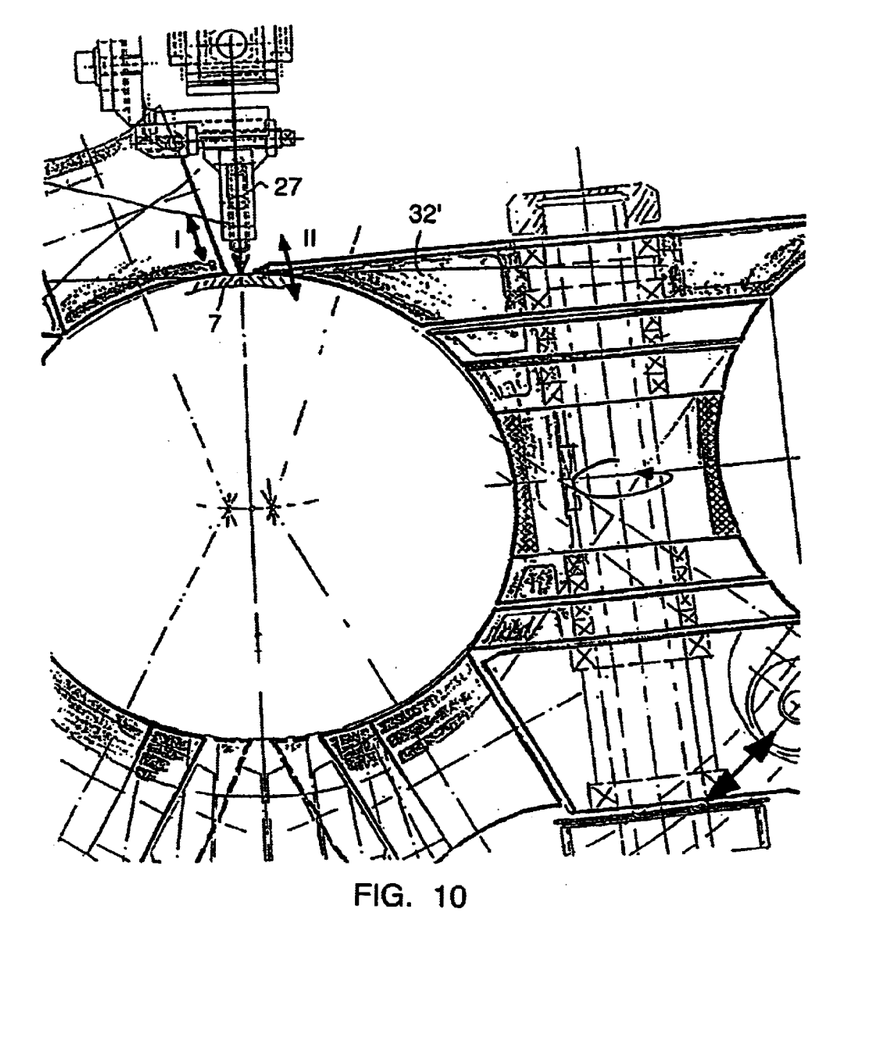
FIG. 10 shows another embodiment of the centring and welding module roller adjacent to the welding zone.

FIG. 10 shows an embodiment offering an alternative to the displaceable rollers 30 and 31. In this case, a roller 32' is provided which replaces the roller 32 and the roller 31 of FIG. 9 (a corresponding roller would be provided in the left half of the figure and would replace the rollers 30 and 35). The upper part 95 of the roller 32' can be moved upwards or downwards in the longitudinal axis of the roller so that the tube-round is again acted upon in the welding zone in order to alter the positioning of the edges in the way which has already been described.

Figure 11:
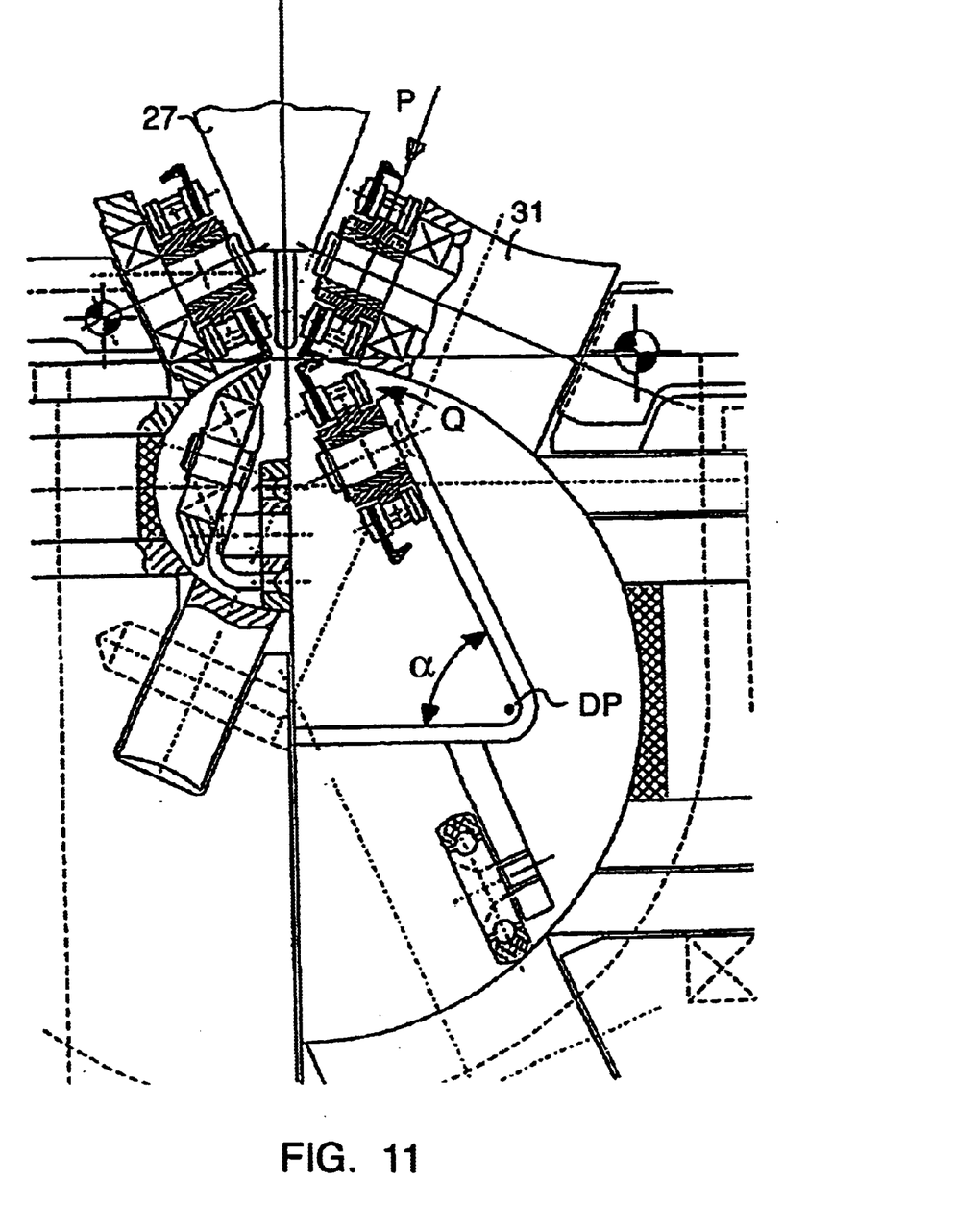
FIG. 11 shows an illustration of the internal rest in the welding zone.

FIG. 11 shows an internal support-rest in the welding zone.

Figure 12:
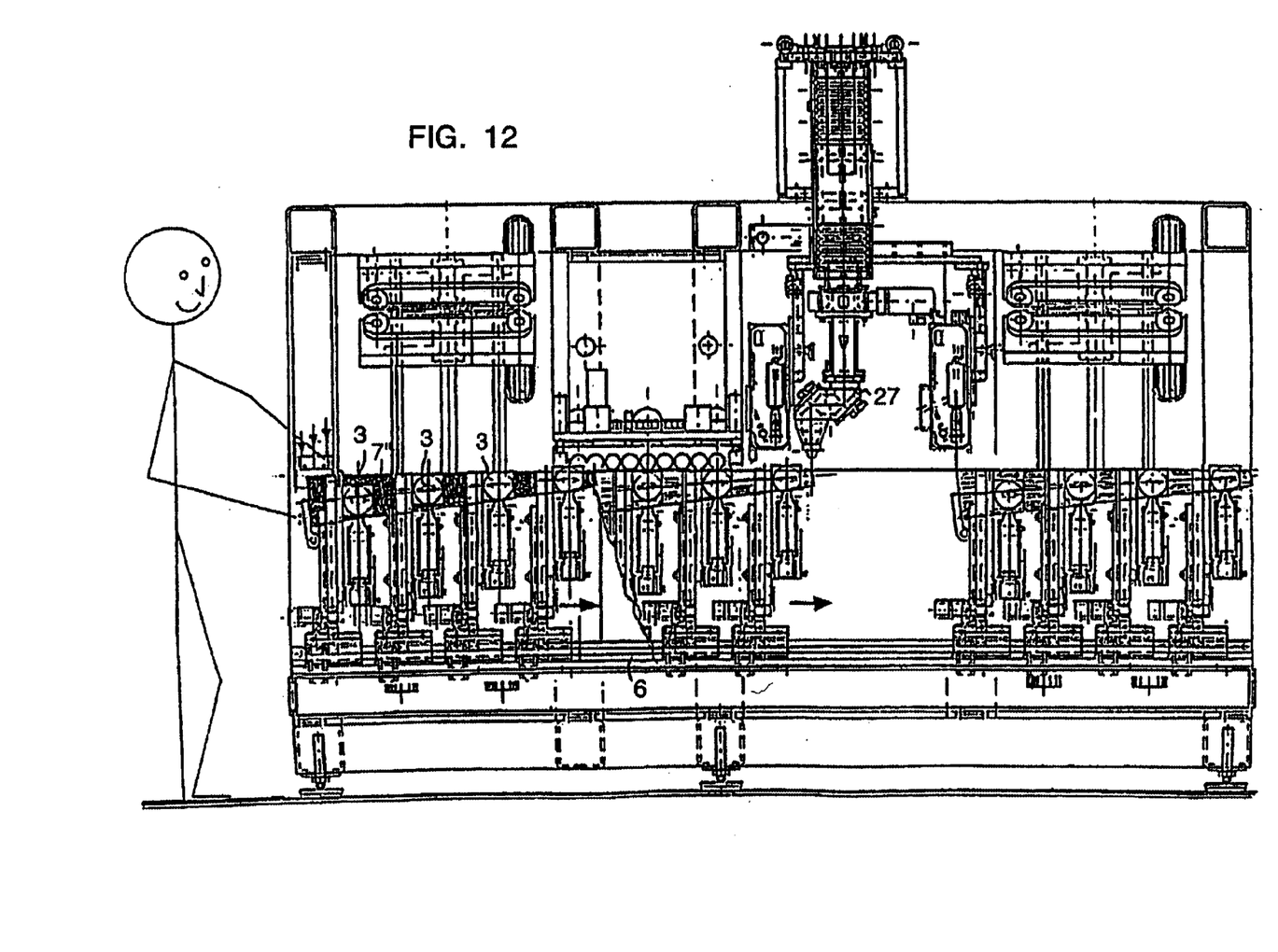
FIG. 12 is a side view of the tube welding machine being used for welding tapered tubes.

FIG. 12 shows a side view of a welding machine 1' in which the lead-in module 2 is absent. The centring and welding module has been modified by removing the centring part from the carrier unit 6 so that only the welding part 27 remains. The individual initial centring modules 3 can now be set so that a tapered tube-round 7" is formed and centred by the pinching tools, as shown. The tools in which each tube-round is held and centred are coupled together, and pass through the machine 1' in this coupled condition, as indicated in the drawing by various positions of the same tube-round 7". In this way the tapered tube-rounds held in the initial-centring modules pass the welding unit and are welded. After passing the welding unit 27, the welded tapered tube can be removed from the coupled initial-centring modules and the latter can be run back again to be loaded with the next conical tube-round 7".

What is claimed is:

1. Method for welding preformed tube-rounds comprising the step of acting upon an individual tube round at a plurality of points on its circumference simultaneously by pinching tools that are individually susceptible to power assisted adjustment essentially towards or away from the longitudinal axis of the tube round so as to bring the longitudinal edges of the tube round into contact with each other to effect the initial positioning of the edges to be welded, the initial positioning in the edge region including dipping a dressing tool into the tube round and forming at least one contact plane for at least one of the edges, and gradually withdrawing the dressing tool from the tube round.

2. Method according to claim 1, further comprising the step of coupling the withdrawal action of the dressing tool with a motion of at least one of the pinching tools.

3. Method according to claim 1, further including the step of providing a plurality of sets of pinching tools along the length of the tube round.

4. Method according to claim 3, wherein the sets of pinching tools are adjustable in relation to one another in the longitudinal direction of the tube-round.

5. Method according to claim 3, wherein the sets of pinching tools can be coupled to each other.

6. Method for welding preformed tube-rounds comprising the steps of:
   acting upon an individual tube round at a plurality of points on its circumference simultaneously by pinching tools that are individually susceptible to power assisted adjustment essentially towards or away from the longitudinal axis of the tube round so as to bring the longitudinal edges of the tube round into contact with each other to effect the initial positioning of the edges to be welded; and
   providing at least one magnetic tool in the region of the edges of the tube round.

7. Method according to claim 6, further including the step of providing a plurality of sets of pinching tools along the length of the tube round.

8. Method according to claim 7, wherein the sets of pinching tools are adjustable in relation to one another in the longitudinal direction of the tube-round.

9. Method according to claim 7, wherein the sets of pinching tools can be coupled to each other.

* * * * *